ically, 2,702,297
Patented Feb. 15, 1955

2,702,297

CYCLOPENTANOPHENANTHRENE COMPOUNDS AND PROCESS

Jesus Romo and George Rosenkranz, Mexico City, Mexico, and Carl Djerassi, Detroit, Mich., assignors to Syntex S. A., Mexico City, Mexico, a corporation of Mexico No Drawing. Application May 16, 1952,
Serial No. 288,312

Claims priority, application Mexico May 25, 1951

10 Claims. (Cl. 260—397.1)

The present application relates to cyclopentanophenanthrene compounds and a process for producing the same. More particularly the present invention relates to a novel process for selectively removing the 16-double bond in $\Delta^{16}$ compounds of the pregnene series without altering other double bonds in the nucleus.

In United States application Serial No. 206,726, filed January 18, 1951, there is disclosed a process for the reaction of $\alpha,\beta$-unsaturated steroid ketones with mercaptans and to novel derivatives produced thereby. In particular in the above application there is disclosed the reaction of pregnene derivatives such as $\Delta^{4,16}$-pregnadiene-3,20-dione (16-dehydroprogesterone) and $\Delta^{5,16}$-pregnadiene-3$\beta$-ol-20-one 3 acetate (16-dehydropregnenolone acetate) with mercaptans to form the corresponding 16 thiobenzyl compounds.

In accordance with the present invention it has been found that these 16 thiobenzyl derivatives can be transformed into the corresponding 16-saturated steroid by removing the 16 thio grouping as by refluxing with Raney nickel catalyst.

It has been further discovered in accordance with the present invention that the mercaptans $\beta$-mercaptoethanol and thioglycolic acid are especially suitable for the production in high yield of 16 thioderivatives which are especially useful intermediates for the production of hormones.

The removal of the 16 thio group in accordance with the present invention may be exemplified by the following equation:

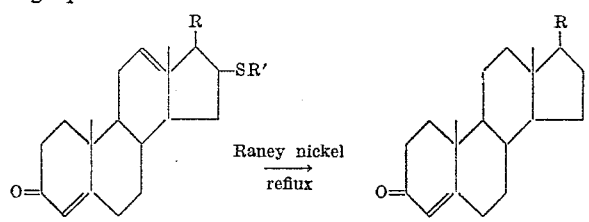

In the above equation R may represent any of radicals characteristic of steroids having substituents in the 17 position such as $COCH_3$, $COCH_2OAC$, $R^1$ is the residue of a mercaptan such as the benzyl radical, the ethyl radical etc. Although the $\Delta^4$-3 keto group is given by way of example above, other groupings in rings A, B and C may be present such as the 11 keto group or the esterified 3$\beta$ hydroxy group and 5–6 double bond characteristic of pregnenolone acetate.

In preparing the 16 thio derivatives referred to above the process set for in the aforementioned prior application is suitable, the steroid being dissolved in a suitable solvent and refluxed with the mercaptan and a catalyst such as pyridine.

The thio group can be removed from the 16-thio compounds previously referred to by reacting the 16-thio compounds with Raney nickel. Thus upon reaction of, for example, 3-acetoxypregnenolone-16-thioacetic acid with Raney nickel as by refluxing in a suitable solvent, such as acetone, pregnenolone acetate is produced. Similarly the reaction of $\Delta^4$-pregnene-16-thioacetic acid with Raney nickel produced progesterone. Similarly other 16-thio compounds can be desulfurized with Raney nickel without affecting double bonds in rings A or B or other functional groups in rings A, B or C and the process is therefore generally applicable to the production of compounds of the pregnene, pregnane or allopregnane series from the corresponding 16-dehydro compounds. Further, the method can also be used in the case of 16-dehydro compounds containing the cortico steroidal side chain at 17.

The following specific examples serve to illustrate but are not intended to limit the present invention:

Example I

A solution of 5 g. of $\Delta^5$, 16-pregnadien-3$\beta$-ol-20-one 3-acetate in 150 cc. of benzene was refluxed during 5 hours with 5 g. of $\beta$-mercaptoethanol and 6 cc. of piperidine. After 20 hours at room temperature, the reaction mixture was washed with dilute hydrochloric acid and with water, dried and evaporated to dryness. One crystallization from etherpentane afforded 90% of 16-($\beta$-hydroxyethylmercapto) - $\Delta^5$ - pregnen-3$\beta$-ol-20-one 3 acetate; melting point 91–93° C., $(\alpha)_D^{20}$ —24.5° (dioxane).

Example II 2 g. of the product obtained according to Example I, was refluxed in acetone solution for 3 hours with 20 g. of Raney nickel. The catalyst was filtered and the solution evaporated to dryness. One crystallization from ethylacetate gave in 52% yield $\Delta^5$-pregnen-3$\beta$-ol-20-one 3-acetate; melting point 147–148° C., $(\alpha)_D^{20}$ —14° (chloroform).

Example III

A solution of 5 g. of $\Delta^{4,16}$-pregnadien-3,20-dione was treated in exactly the same maner as described in Example I. One crystallization from methanol afforded 92% of 16 - ($\beta$ - hydroxyethylmercapto)-progesterone; melting point 72–74° C., $(\alpha)_D^{20}$ +84° (dioxane).

Example IV

An acetone solution of 2 g. of the product obtained according to Example III was treated in the same way as described in Example II, yielding after one crystallization from methanol, 60% of progesterone with melting point 127–128° C.

Example V

An acetone solution of 2 g. of 16-thiobenzylprogesterone, obtained according to the method set forth in United States application Serial No. 206,726, was treated exactly as described in Example II; after one crystallization from methanol, progesterone was obtained in 63% yield; melting point 127–129° C.

Example VI 6 g. of $\Delta^{5,16}$-pregnadiene-3$\beta$-ol-20-one acetate and 6 cc. of thioglycolic acid were dissolved in 210 cc. of benzene. After distilling 60 cc. of benzene, 7 cc. of piperidine were added and the solution was refluxed for 5 hours. The mixture was washed with water and then with dilute hydrochloric acid to remove the piperidine. The product was extracted with three portions of saturated sodium carbonate solution and the alkaline solution was acidified with hydrochloric acid to precipitate the product which was filtered after a few hours, washed and dried. It yielded 5.5 g. of 3-acetoxy-pregnenolone-16-thioacetic acid; melting point 180–182° C., $(\alpha)_D$ —37° (dioxane).

For further identification of the product, a methyl ester was prepared by esterification with diazomethane by known methods. The methyl ester of 3-acetoxy-pregnenolone-16-thioacetic acid had melting point 136–138° C., $(\alpha)_D^{20}$ —20 (dioxane).

Example VII 20 g. of Raney nickel were added to a solution of 1 g. of 3-acetoxypregnenolone-16-thioacetic acid in 100 cc. of acetone and the mixture was refluxed during 2 hours. The catalyst was removed by filtration and the solution was evaporated to dryness. Crystallization of the residue from methanol yielded 600 mg. of pregnenolone acetate with melting point 140–144° C., $(\alpha)_D^{20}$ —17° (chloroform).

Example VIII

A solution of 10 g. of Δ⁴,¹⁶-pregnadiene-3,20-dione was treated in exactly the same way as described in Example VI to give 89% yield of Δ⁴-pregnen-3,20-dione-16-thioacetic acid in the form of a yellow oil.

Example IX 2 g. of the oil obtained according to Example VIII were dissolved in acetone and treated in exactly the same way as described in Example VII. One recrystallization of the product from methanol afforded 63% of progesterone; melting point 126–128°.

We claim:

1. A process for the production of 16-saturated steroids of the pregnene series from corresponding 16-dehydrosteroids of the pregnene series which comprises reacting said 16-dehydrosteroid with a mercaptan in the presence of a catalyst to form the corresponding 16-thiosteroid and refluxing said 16-thiosteroid in the presence of Raney nickel catalyst.

2. The process of claim 1 wherein the steroid is 16-dehydroprogesterone, the mercaptan is β-mercaptoethanol and the catalyst is piperidine.

3. The process of claim 1 wherein the steroid is Δ⁴,¹⁶-pregnadien-3β-ol-20-one 3 acetate, the mercaptan is β-mercaptoethanol and the catalyst is piperidine.

4. The process of claim 1 wherein the steroid is 16-dehydroprogesterone, the mercaptan is thioglycolic acid and the catalyst is piperidine.

5. The process of claim 1 wherein the steroid is Δ⁴,¹⁶-pregnadien-3β-ol-20-one 3 acetate, the mercaptan is thioglycolic acid and the catalyst is piperidine.

6. A new compound consisting of 16-(β-hydroxyethylmercapto)-Δ⁵-pregnen-3β-ol-20-one 3-acetate having a melting point of 91–93° C.

7. A new compound consisting of 16-(β-hydroxyethylmercapto)-progesterone having a melting point of 72–74° C.

8. A new compound consisting of 3-acetoxypregnenolone-16-thioacetic acid having a melting point of 180–182° C.

9. A new compound consisting of Δ⁴-pregnen-3,20-dione-16-thioacetic acid.

10. A new compound selected from the group consisting of compounds of the following formula:

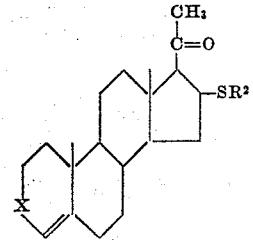

and

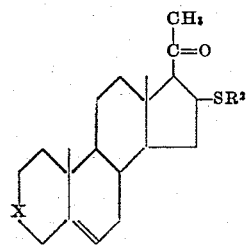

wherein X is selected from the group consisting of C=O and

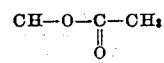

and SR² is selected from the group consisting of the residue of β-mercaptoethanol and thioglycolic acid.

No references cited.